US009753566B2

(12) United States Patent
Tsuzuki et al.

(10) Patent No.: US 9,753,566 B2
(45) Date of Patent: Sep. 5, 2017

(54) ELECTRONIC BOOK WITH EXTRA FREE CONTENT

(71) Applicant: Kabushiki Kaisha Toshiba, Tokyo (JP)

(72) Inventors: Yoshiyuki Tsuzuki, Sagamihara Kanagawa (JP); Takashi Nishimura, Tokyo (JP); Go Fujino, Kiyose (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/157,277

(22) Filed: May 17, 2016

(65) Prior Publication Data

US 2016/0259456 A1 Sep. 8, 2016

Related U.S. Application Data

(63) Continuation of application No. 14/460,182, filed on Aug. 14, 2014, now abandoned.

(30) Foreign Application Priority Data

Dec. 27, 2013 (JP) .................................. 2013-270980

(51) Int. Cl.
*G06F 3/041* (2006.01)
*H04N 21/4722* (2011.01)
(Continued)

(52) U.S. Cl.
CPC .......... *G06F 3/0412* (2013.01); *G06F 3/0483* (2013.01); *G06Q 30/02* (2013.01);
(Continued)

(58) Field of Classification Search
CPC .. G06F 15/0291; G06F 3/0412; G06F 3/0483; G06F 2203/04106; G06F 3/1285;
(Continued)

(56) References Cited

U.S. PATENT DOCUMENTS 6,567,919 B1 5/2003 Yanagihara et al.
7,124,094 B1 10/2006 Kobayashi et al.
(Continued)

FOREIGN PATENT DOCUMENTS

JP 2001256162 A 9/2001
JP 2001-283071 10/2001
(Continued)

OTHER PUBLICATIONS

Office Action dated Feb. 23, 2016 for U.S. Appl. No. 14,460,182, filed Aug. 14, 2014.

*Primary Examiner* — Larry Sternbane
(74) *Attorney, Agent, or Firm* — Blakely Sokoloff Taylor & Zafman LLP

(57) ABSTRACT

According to one embodiment, a device includes a first acquisition processing module, a touchscreen display, a display processing module, a second acquisition processing module, and a request processing module. The first acquisition processing module acquires first content from a first delivery device. The display processing module displays content based on the first content on the touchscreen display. The second acquisition processing module acquires second content from a second delivery device based on data included in the first content, when a predetermined operation is executed for the touchscreen. The request processing module requests an output processing device corresponding to the second content to execute output processing based on the second content.

17 Claims, 7 Drawing Sheets

(51) Int. Cl.
*G06F 3/0483* (2013.01)
*G06F 15/02* (2006.01)
*G06Q 30/02* (2012.01)

(52) U.S. Cl.
CPC ..... *H04N 21/4722* (2013.01); *G06F 15/0291* (2013.01); *G06F 2203/04106* (2013.01)

(58) Field of Classification Search
CPC ... G06F 3/1292; G06Q 30/02; H04N 21/4722
See application file for complete search history.

(56) References Cited

U.S. PATENT DOCUMENTS

| | | |
|---|---|---|
| 7,167,841 B2 | 1/2007 | Hatano et al. |
| 2001/0024444 A1 | 9/2001 | Asai |
| 2005/0091698 A1 | 4/2005 | Shikata |
| 2011/0276863 A1 | 11/2011 | Bhise et al. |
| 2012/0254347 A1* | 10/2012 | Seetharam ........ G06F 17/30029 709/217 |
| 2013/0080881 A1* | 3/2013 | Goodspeed ............. G06F 17/21 715/251 |
| 2014/0046809 A1 | 2/2014 | Baker et al. |
| 2014/0195890 A1* | 7/2014 | Taylor .................... G06F 17/30 715/234 |

FOREIGN PATENT DOCUMENTS

| | | |
|---|---|---|
| JP | 2002-014796 | 1/2002 |
| JP | 2002-540490 | 11/2002 |
| JP | 2005130082 A | 5/2005 |
| JP | 2008259125 A | 10/2008 |
| JP | 2013-047928 | 3/2013 |
| JP | 2013-120533 | 6/2013 |
| JP | 2013-152647 | 8/2013 |

* cited by examiner

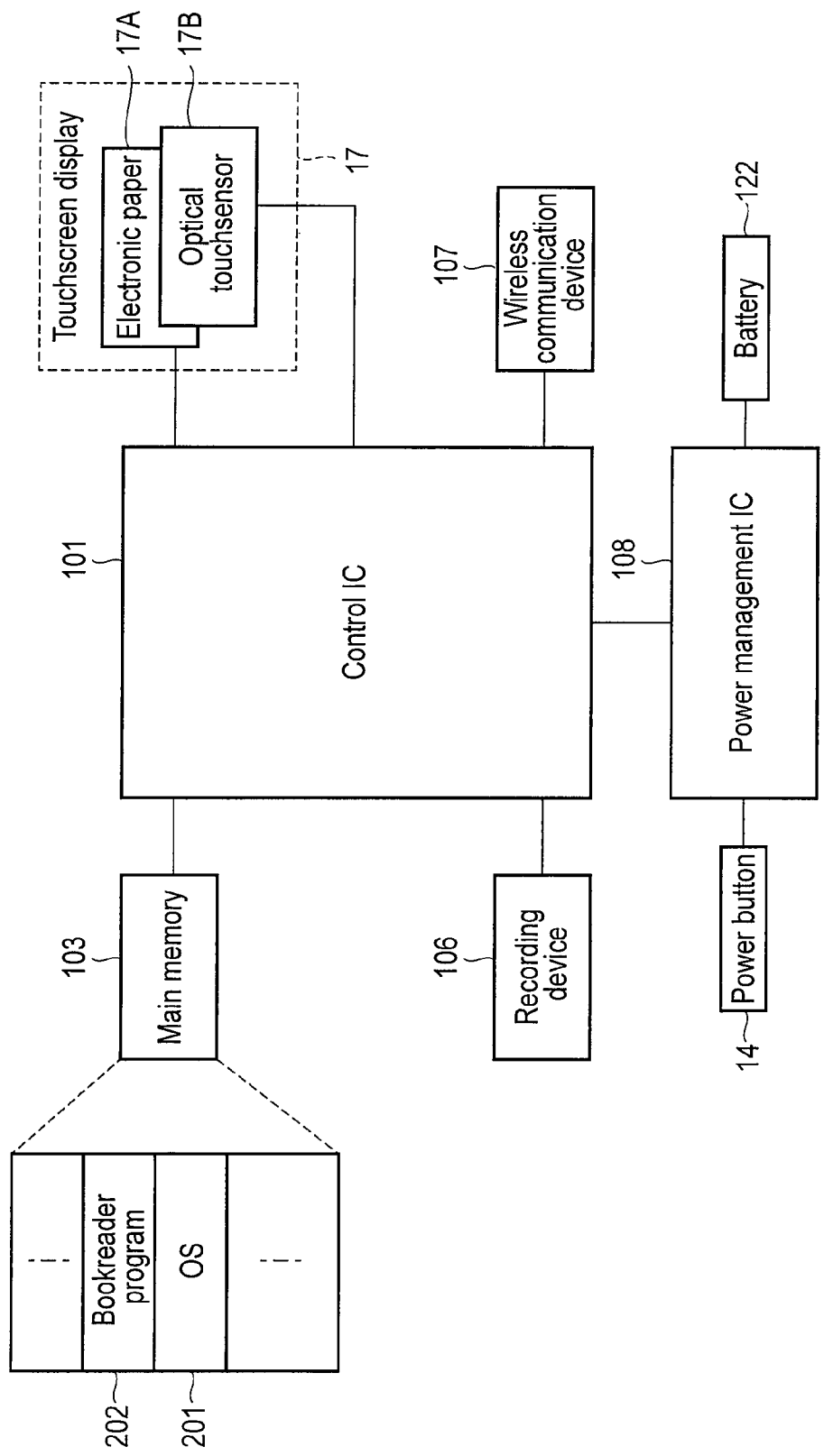
F I G. 2

| Book ID | Book name | Supplementary data flag | etc... |
|---|---|---|---|
| 1 | Guide to figure creation | Yes | |
| 2 | XX's travels | No | |
| 3 | Let's create robot! | Yes | |
| 4 | Complete anime works 2013 | Yes | |
| ⋮ | ⋮ | ⋮ | |

FIG. 4

| Extra free content ID | Extra free content name | Method of invoking extra free content | Expiration date | etc... |
|---|---|---|---|---|
| 100 | Figure 3D model (1) | 3D printer/ WiFi | 2013/12/1 | |
| 110 | XX robot Punching pose | XX robot/ Bluetooth | No expiration date | |
| 120 | Anime Impressive line | Player/ infrared ray | 2015/12/31 | |
| 130 | XX boat Blueprint | Printer/ WiFi | 2013/11/1 | |
| ⋮ | ⋮ | ⋮ | ⋮ | |

FIG. 5

| Book ID | Extra free content ID | Supplement display location | etc... |
|---|---|---|---|
| 1 | 100 | 130Page | |
| 3 | 120 | △△Page | |
| 4 | 130 | XXPage | |
| ⋮ | ⋮ | ⋮ | |

ELECTRONIC BOOK WITH EXTRA FREE CONTENT

CROSS-REFERENCE TO RELATED APPLICATIONS

This application is based upon and claims the benefit of priority from Japanese Patent Application No. 2013-270980, filed Dec. 27, 2013, the entire contents of which are incorporated herein by reference. This application is also a continuation of and claims the benefit of priority from U.S. application Ser. No. 14/460,182, filed on Aug. 14, 2014, the entire contents of which are incorporated herein.

FIELD

Embodiments described herein relate generally to a technique of outputting second content as a supplement of first content.

BACKGROUND

The sales of printed books and magazines in a bookstore are usually boosted by being sold as a supplement together with various goods. On the other hand, there is a case where an ebook and its additional book content as a supplement are sold as a single book. Such a sales strategy is differentiated from that of printed books.

As a supplement of an ebook, for example, extra content of an ebook is provided, and a free gift is prepared in liaison with a goods-selling website and shipped later. Currently, it is possible to provide only a supplement that can be output and processed in a device with which to browse an ebook. It is desirable to make another device output and process second content (for example, supplement of ebook) acquired based on first content (for example, ebook).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram illustrating a system configuration of the electronic device of the embodiment.

FIG. 4 is an exemplary table illustrating ebook content management data.

FIG. 5 is an exemplary table illustrating extra free content metadata.

DETAILED DESCRIPTION

Various embodiments will be described hereinafter with reference to the accompanying drawings.

In general, according to one embodiment, an electronic device includes a first acquisition processing module, a touchscreen display, a display processing module, a second acquisition processing module, and a request processing module. The first acquisition processing module is configured to acquire first content from a first delivery device. The display processing module is configured to display content based on the first content on the touchscreen display. The second acquisition processing module is configured to acquire second content from a second delivery device based on data included in the first content, when a predetermined operation is executed for the touchscreen. The request processing module is configured to request an output processing device corresponding to the second content to execute output processing based on the second content.

Figure 1:
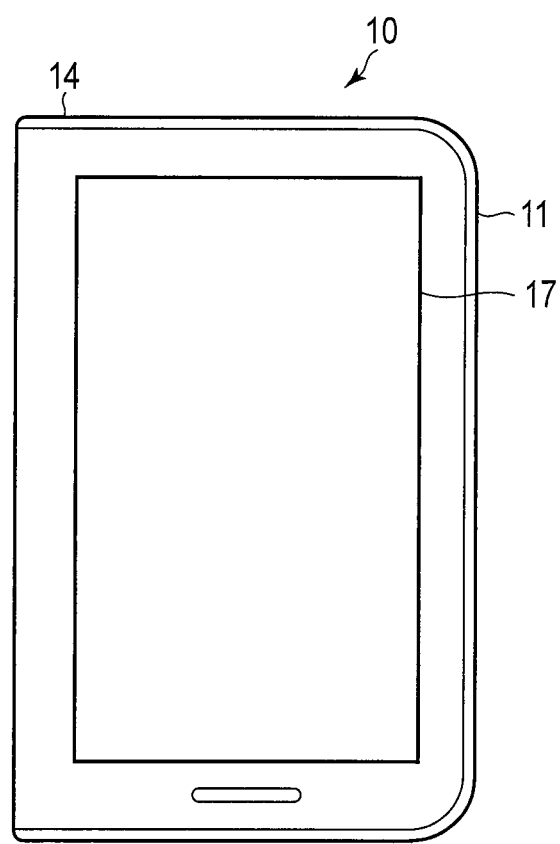
FIG. 1 is an exemplary view illustrating an exterior of an electronic device of the embodiment.

FIG. 1 illustrates the exterior of the electronic device of the embodiment. The electronic device is a portable electronic device capable of, for example, pointing by a stylus or finger and inputting handwritten characters. The electronic device can be realized as an ebook browsing device, a tablet computer, a notebook personal computer, a smartphone, a PDA, etc. In the following, it is assumed that the electronic device is realized as an ebook browsing device 10. The ebook browsing device 10 is a portable electronic device that is also called a bookreader.

An ebook browsing device main body 11 has a thin box-shaped housing. The side surface of the ebook browsing device main body 11 is provided with a power button 14 to power on/off the ebook browsing device 10. The power button 14 is an interface for booting the device. A touchscreen display 17 is provided on the surface of the ebook browsing device main body 11. The touchscreen display 17 comprises a flat panel display (for example, electronic paper) and an optical touchsensor. The optical touchsensor is configured to detect a position, which is on the touchscreen display 17, touched by a user's finger or stylus.

FIG. 2 illustrates the system configuration of the ebook browsing device 10 of the embodiment.

As shown in FIG. 2, the ebook browsing device 10 comprises a control IC 101, a main memory 103, a recording device 106, a wireless communication module 107 and a power management IC 108.

The recording device 106 is a nonvolatile storage module comprising a nonvolatile memory, a flash memory, a magnetoresistive memory and a hard disk drive.

The control IC 101 comprises a main processor, a main memory and a graphics processor.

The main processor controls the operation of each module in the ebook browsing device 10. The main processor executes each program loaded from the recording device 106 to the main memory 103. Programs executed by the main processor include an operating system (OS) 201, a bookreader application program 202 and each application program. The bookreader application program 202 is a program for, for example, downloading ebook content and extra free content, managing an ebook and displaying an ebook.

The graphics controller is a display controller for controlling electronic paper 17A, which is used as a display monitor of the ebook browsing device 10. A display signal generated by the graphics controller is transmitted to the electronic paper 17A. The electronic paper 17A displays a screen image based on the display signal. On the electronic paper 17A, an optical touchsensor 17B is provided as a position detecting device. The optical touchsensor 17B is an optical pointing device for inputting on the screen of the electronic paper 17A. A contact position on the screen touched by a finger, a movement of the contact position, etc., are detected by the optical touchsensor 17B.

The wireless communication device 107 is a device configured to execute wireless communication such as wireless LAN and 3G mobile communication.

The power management IC 108 is a single-chip microcomputer for power management. The power management IC 108 has a function to power on, power off and put to sleep the ebook browsing device 10 upon pressing the power button 14 by a user.

Also, the power management IC 108 generates operation power that should be supplied to each component, by using power that is supplied from a battery 122 in the ebook browsing device 10. Further, the power management IC 108 charges the battery 122 by using power that is supplied from an external power source.

Figure 3:
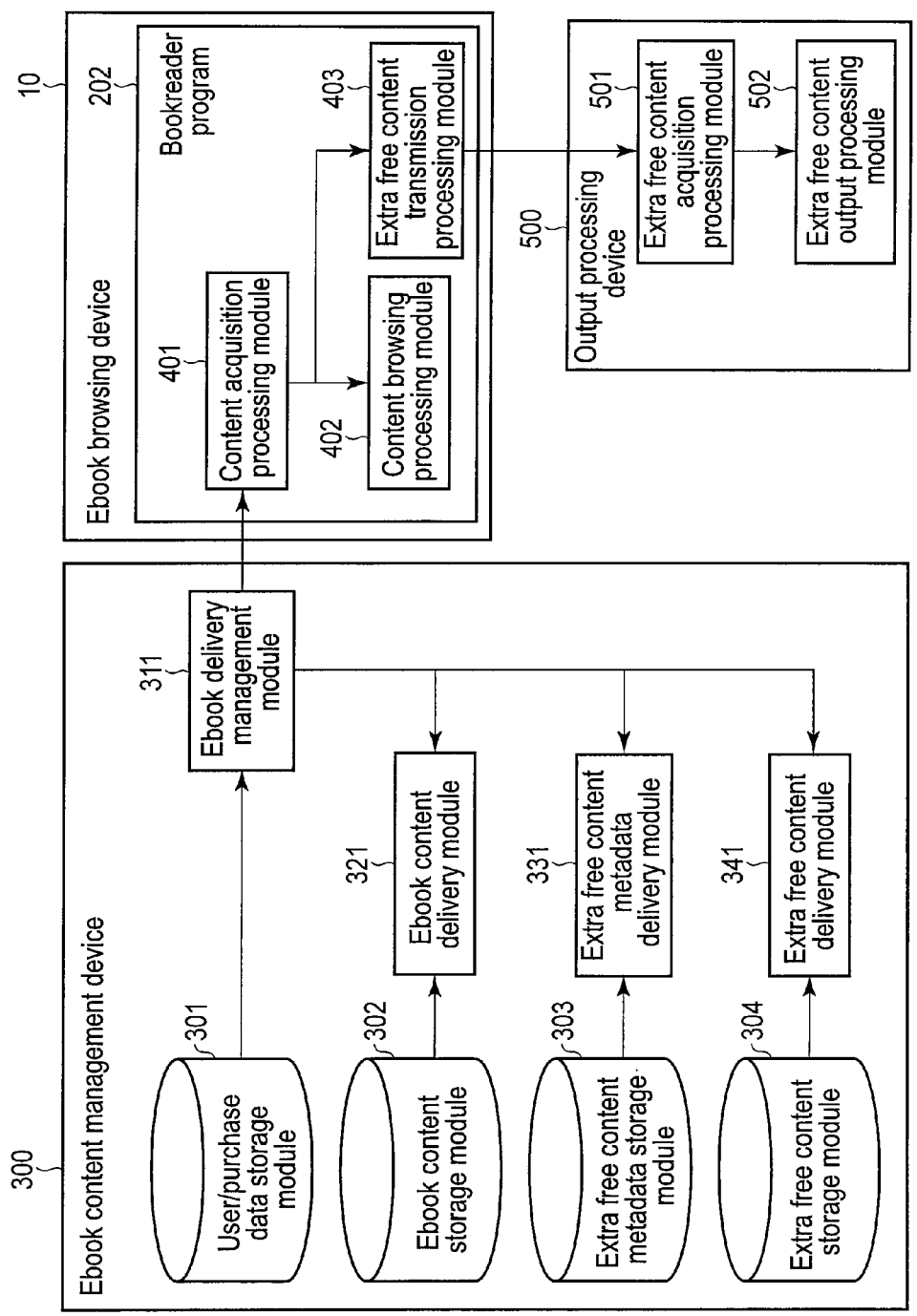
FIG. 3 is a block diagram illustrating a configuration of a system comprising the electronic device of the embodiment.

FIG. 3 illustrates the configuration of the system of the electronic device of the embodiment.

The system comprises the ebook browsing device 10, an ebook content management device 300 and an output processing device 500.

The ebook content management device 300 comprises a user/purchase data storage module 301, an ebook content storage module 302, an extra free content metadata storage module 303, an extra free content storage module 304, an ebook delivery management module 311, an ebook content delivery module 321, an extra free content metadata delivery module 331 and an extra free content delivery module 341.

The user/purchase data storage module 301 stores the data of a user who uses the ebook content management device and the user's content purchase history. The ebook content storage module 302 stores ebook content. The ebook content storage module 302 also stores ebook content management data.

FIG. 4 illustrates an example of ebook content management data. As shown in FIG. 4, the ebook content storage module 302 has data associated with a book ID, a book title and a supplementary data flag. A supplementary data flag shows whether book content has extra free content. The extra free content metadata storage module 303 stores extra free content metadata.

FIG. 5 illustrates an example of extra free content metadata. Extra free content metadata has data associated with an extra free content ID, an extra free content name, a method of invoking extra free content, and an expiration date. The method of invoking an extra free content shows a device and a communication method of outputting extra free content. Also, the extra free content storage module 304 has ebook/supplement management data.

Figures 6, 7:
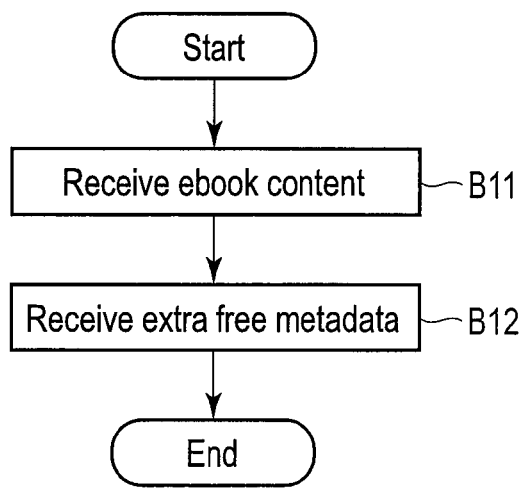
FIG. 6 is an exemplary table illustrating ebook/supplement management data.
FIG. 7 is an exemplary flowchart illustrating a step where an ebook browsing device of the embodiment receives the metadata of ebook content and extra free content.

FIG. 6 illustrates an example of table illustrating ebook/supplement management data. Ebook/supplement management data is data for associating ebook content management data with extra free content metadata. Ebook/supplement management data is associated with, for example, content management data, a book ID, an extra free content ID and a supplement display position. A supplement display position shows a position (the number of pages) that stores the data indicative of extra free content in book content. The extra free content storage module 304 stores data that serves as electronic data for realizing content that serves as a supplement.

The ebook delivery management module 311 manages the data of a user who uses the ebook content management device in the user/purchase data storage module 301 and the user's content purchase history. The ebook content delivery module 321 delivers to the ebook browsing device 10 ebook content stored in the ebook content storage module 302, upon request from the ebook browsing device 10. The extra free content metadata delivery module 331 delivers to the ebook browsing device 10 extra free content metadata stored in the extra free content metadata storage module 303, upon request from the ebook browsing device 10. The extra free content delivery module 341 delivers to the ebook browsing device 10 extra free content stored in the extra free content storage module 304, upon request from the ebook browsing device 10.

The ebook browsing device 10 comprises a content acquisition processing module 401, a content browsing processing module 402 and an extra free content transmission processing module 403.

The content acquisition processing module 401 of the ebook browsing device 10 accesses the ebook delivery management module 311 via the internet to acquire the metadata of ebook content and extra free content based on user/purchase data. The content browsing processing module 402 displays the acquired content.

When the supplementary metadata connected to content exists for a page being displayed, a link or a button that invokes extra free content in a method designated by metadata is displayed. When a user invokes extra free content, the extra free content transmission processing module 403 transmits extra free content to the output processing device 500. The extra free content transmission processing module 403 transmits extra free content to request output processing of extra free content by using a communication means such as wireless LAN, Bluetooth® and USB.

The output processing device 500 comprises a content acquisition processing module 501 and an extra free content output processing module 502. The content acquisition processing module 501 receives extra free content data transmitted from the extra free content transmission processing module 403. The extra free content output processing module 502 executes output processing to output content based on extra free content data. For example, when the output processing device 500 is a 3D printer, the content output processing module 312 creates 3D model data. When the output processing device 500 is a robot, the content output processing module 312 tangibly realizes content such as a computer-controlled robot instructed to move in a designated way.

FIG. 7 is a flowchart illustrating a step where the ebook browsing device 10 receives the metadata of ebook content and extra free content.

The content acquisition processing module 401, as a first acquisition processing means, requests the ebook delivery management module 311 to deliver ebook content selected by a user. The ebook content delivery module 321 delivers ebook content to the ebook browsing device 10, upon request from the content acquisition processing module 401. The content acquisition processing module 401 receives ebook content delivered from the ebook content delivery module 321 (step B11).

The content acquisition processing module 401, as a second acquisition processing means, requests the ebook delivery management module 311 to deliver the extra free content metadata corresponding to ebook content selected by a user. The extra free content metadata delivery module 331 delivers to the ebook browsing device 10 the extra free content metadata corresponding to ebook content, upon request from the content acquisition processing module 401. The content acquisition processing module 401 receives the extra free content metadata delivered from the extra free content metadata delivery module 331 (step B12).

Figure 8:
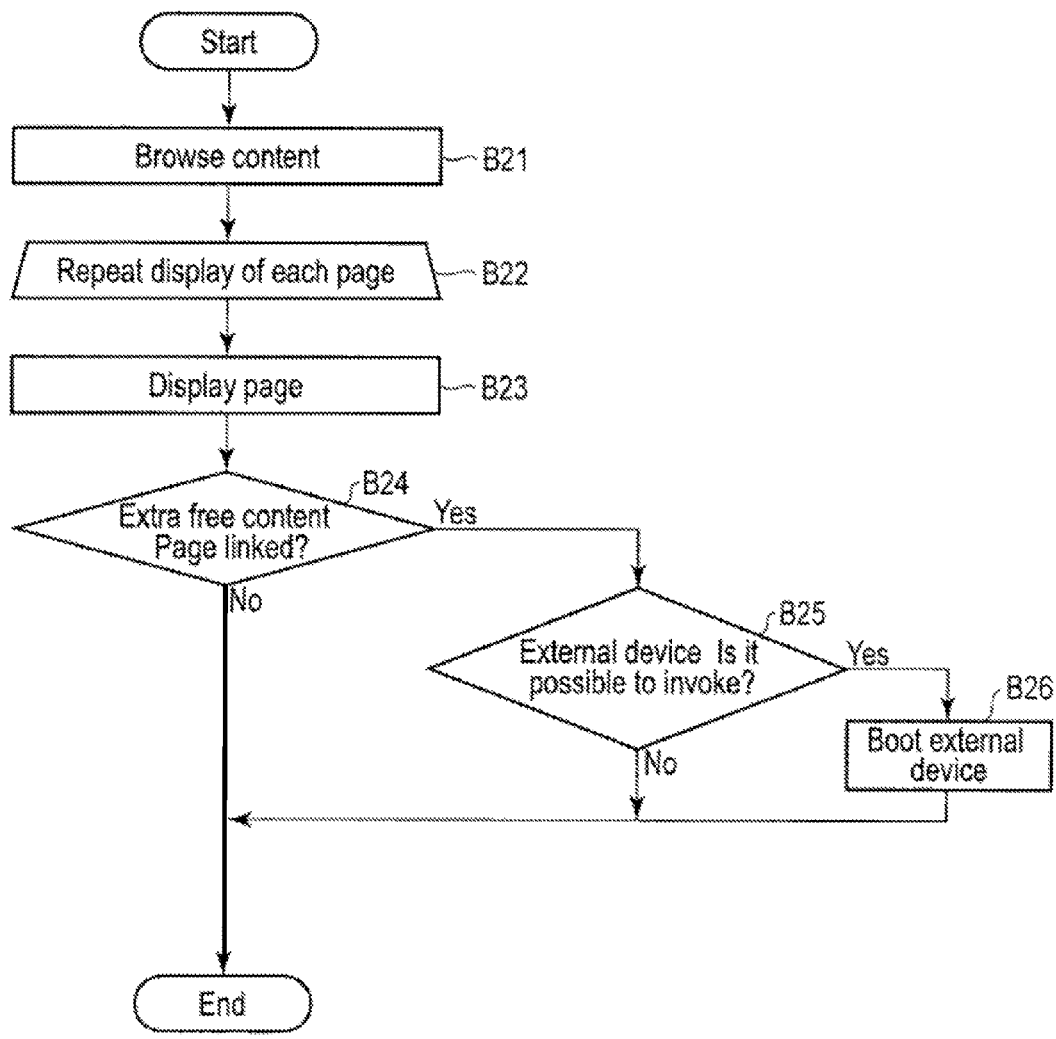
FIG. 8 is an exemplary flowchart illustrating a step where a content browsing processing unit executes processing while ebook content is displayed.

FIG. 8 is a flowchart illustrating a step where the content browsing processing module 402 executes processing while ebook content is displayed.

The content browsing processing module 402 executes processing to display on the electronic paper 17A content based on ebook content selected by a user (step B21). When a paging operation is executed (step B22), the content browsing processing module 402 executes processing to display on the electronic paper 17A the next page or the preceding page (step B23). The extra free content transmission processing module 403 determines whether a newly displayed page is linked to extra free content, based on a supplement display position included in the extra free content metadata corresponding to ebook content being browsed (step B24). When it is determined the page is linked to the extra free content (step B24, Yes), the extra free content transmission processing module 403 determines whether to communicate with the output processing device 500 corresponding to extra free content, based on a method of invoking extra free content included in the extra free content metadata corresponding to ebook content being browsed (step B25). When it is determined that the extra free content transmission processing module 403 is incapable of communicating with the output processing device 500 (step B25, Yes), the extra free content transmission processing module 403 requests the output processing device 500 to be booted (step B26).

Figure 9:
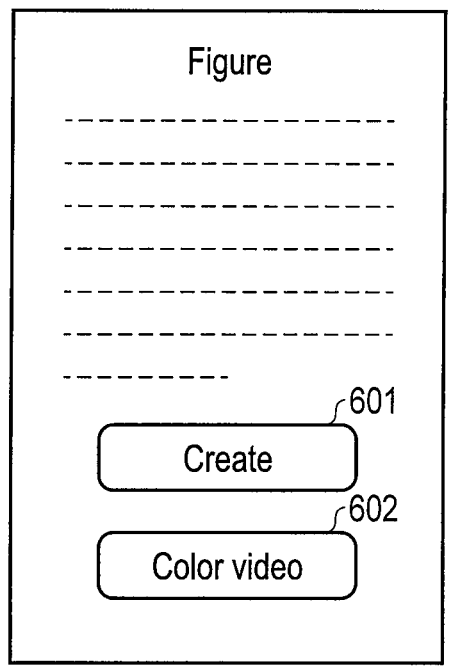
FIG. 9 is an exemplary view illustrating extra free content link page.

FIG. 9 illustrates an example of an extra free content link page.

An extra free content link page displayed by the content browsing processing module 402 displays a button 601 and a button 602 as an object to start acquiring extra free content. The buttons 601 and 602 are associated with extra free content IDs that represent extra free content, respectively. The button 601 corresponds to data for a 3D printer to create a figure. The button 602 corresponds to video data that films a process of coloring a created figure.

When the optical touchsensor 17B detects a touch operation on the button 601, the content acquisition processing module 401 requests the ebook content management device 300 to transmit data for a 3D printer to create a figure, based on an extra free content ID associated with the button 601. When the optical touchsensor 17B detects a touch operation on the button 602, the content acquisition processing module 401 requests the ebook content management device 300 to transmit video data, based on an extra free content ID associated with the button 602.

When extra free content is delivered, the extra free content transmission processing module 403 as a processing request means transmits data to the output processing device 500 corresponding to the extra free content and requests the output processing device 500 to execute processing of the extra free content, based on a method of invoking extra free content included in the extra free content metadata corresponding to ebook content being browsed.

Figure 10:
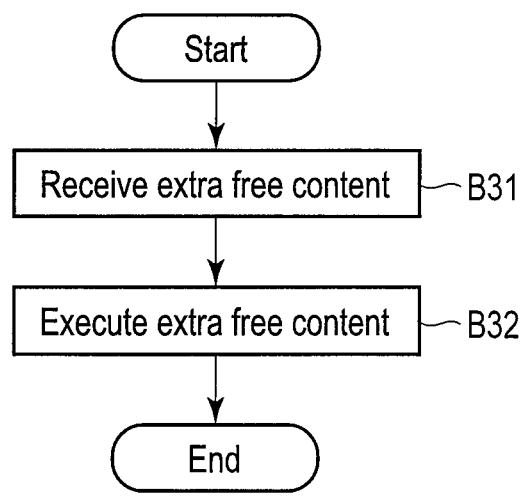
FIG. 10 is an exemplary flowchart illustrating a step where an output processing device outputs extra free content.

FIG. 10 is a flowchart illustrating a step where the output processing device 500 outputs extra free content.

The content acquisition processing module 501 receives extra free content transmitted from the extra free content transmission processing module 403 (step B31). The extra free content output processing module 502 executes processing to output content based on the extra free content.

According to the embodiment, when ebook content is acquired from the ebook content management device 300, content based on the ebook content is displayed on the touchscreen display 17 and a predetermined operation is executed for the touchscreen display 17, it is possible to make another device execute output processing of extra free content acquired based on the ebook content, by acquiring the extra free content from the ebook content management device 300 and by requesting the output processing device 500 corresponding to the extra free content to execute output processing based on the extra free content.

Also, since each processing in the embodiment can be realized by a computer program, the same effect as the embodiment can be easily realized simply by installing and executing the computer program to a normal computer through a computer-readable storage medium that stores the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device connectable to external content output devices, the electronic device comprising:
   a display; and
   a hardware processor configured to
      receive first content and metadata, the first content comprising pages, the pages comprising a first page displaying an object linked to a second content, the metadata indicative of one of the external content output devices configured to output the second content,
      display the pages of the first content on the display,
      receive the second content when the object displayed in the first page is selected by a user, and
      supply the second content to the one of the external content output devices based on the metadata.

2. The electronic device of claim 1, wherein the display comprises a touch screen display and the user is able to select the object by touch operation.

3. The electronic device of claim 1, wherein the one of the external content output devices comprises a printer configured to print the second content, a player configured to play back the second content, or a robot configured to operate based on the second content.

4. The electronic device of claim 1, wherein the hardware processor is further configured to turn on the one of the external content output devices if the one of the external content output devices is not turned on when the second content is supplied to the one of the external content output devices.

5. The electronic device of claim 1, wherein the metadata is further indicative of a communication method for supplying the second content to the one of the external content output devices.

6. The electronic device of claim 1, wherein the first content comprises a book for sale and the second content comprises an extra free content.

7. A method comprising:
receiving, by an electronic device, first content and metadata, the first content comprising pages, the pages comprising a first page displaying an object linked to a second content, the metadata indicative of one of external content output devices configured to output the second content and connected to the electronic device;
displaying, by the electronic device, the pages of the first content;
receiving, by the electronic device, the second content when the object displayed in the first page is selected by a user; and
supplying, by the electronic device, the second content to the one of the external content output devices based on the metadata.

8. The method of claim 7, wherein the one of the external content output devices comprises a printer configured to print the second content, a player configured to play back the second content, or a robot configured to operate based on the second content.

9. The method of claim 7, further comprising turning on the one of the external content output devices if the one of the external content output devices is not turned on when the second content is supplied to the one of the external content output devices.

10. The method of claim 7, wherein the metadata is further indicative of a communication method for supplying the second content to the one of the external content output devices.

11. The method of claim 7, wherein the first content comprises a book for sale and the second content comprises an extra free content.

12. A non-transitory computer readable medium having a plurality of executable instructions stored thereon configured to cause one or more computers to perform processing, the processing comprising:
receiving, by the one or more computers, first content and metadata, the first content comprising pages, the pages comprising a first page displaying an object linked to a second content, the metadata indicative of one of external content output devices configured to output the second content and connected to the one or more computers;
displaying, by the one or more computers, the pages of the first content;
receiving, by the one or more computers, the second content when the object displayed in the first page is selected by a user; and
supplying, by the one or more computers, the second content to the one of the external content output devices based on the metadata.

13. The medium of claim 12, wherein the display comprises a touch screen display and the user is able to select the object by a touch operation.

14. The medium of claim 12, wherein the one of the external content output devices comprises a printer configured to print the second content, a player configured to play back the second content, or a robot configured to operate based on the second content.

15. The medium of claim 12, further comprising turning on the one of the external content output devices if the one of the external content output devices is not turned on when the second content is supplied to the one of the external content output devices.

16. The medium of claim 12, wherein the metadata is further indicative of a communication method for supplying the second content to the one of the external content output devices.

17. The medium of claim 12, wherein the first content comprises a book for sale and the second content comprises an extra free content.

* * * * *